May 27, 1969

D. M. TURNBULL 3,446,692

INSULATED PANEL AND METHOD OF MAKING SAME

Filed June 1, 1964

INVENTOR.
Donald M. Turnbull
BY
Wood, Herron & Evans
ATTORNEYS

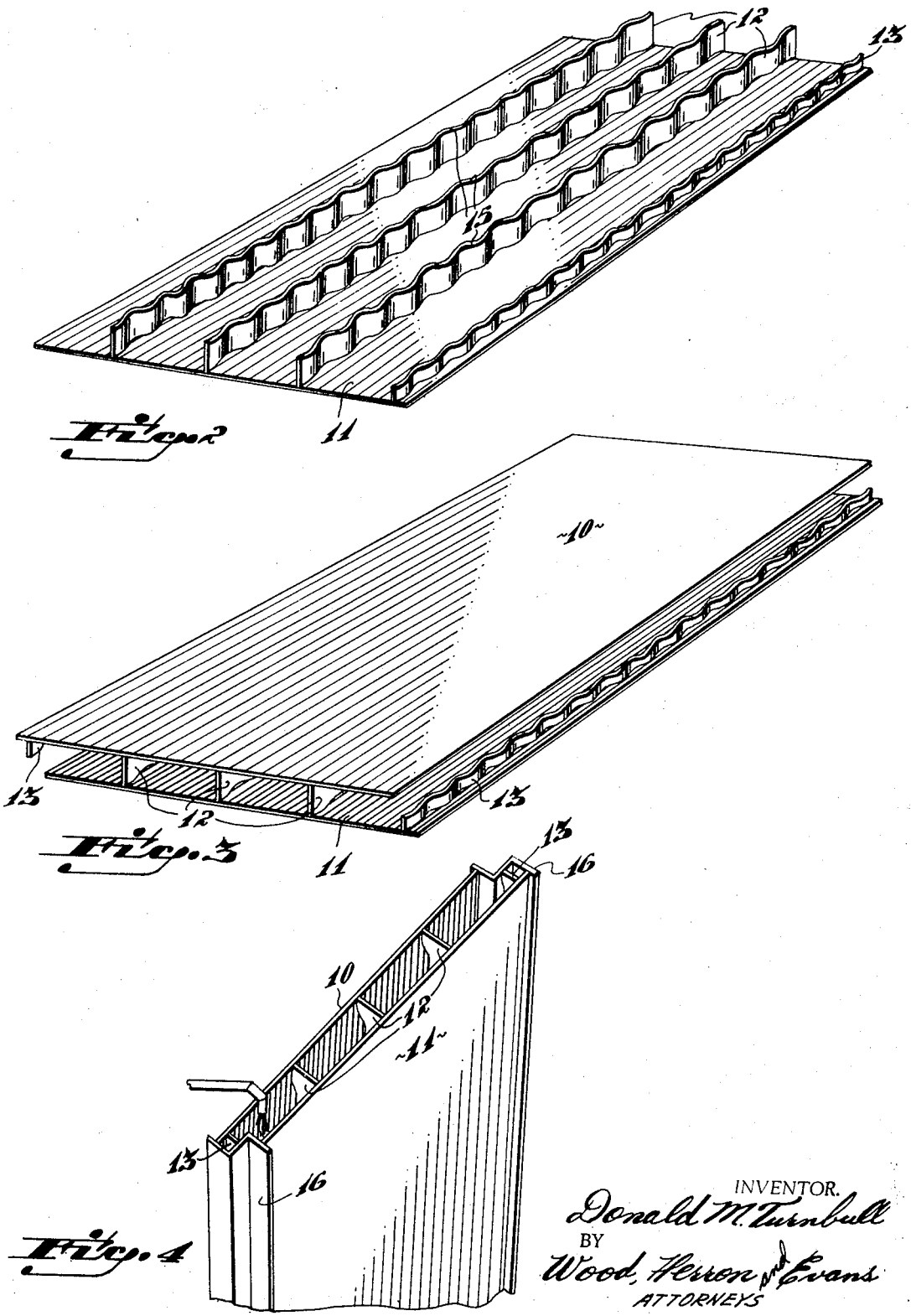

United States Patent Office 3,446,692
Patented May 27, 1969

3,446,692
INSULATED PANEL AND METHOD
OF MAKING SAME
Donald M. Turnbull, Cincinnati, Ohio, assignor to Pullman Incorporated, Chicago, Ill., a corporation of Delaware
Filed June 1, 1964, Ser. No. 371,450
Int. Cl. E04b 5/43; B32b 31/06, 27/40
U.S. Cl. 161—69                                6 Claims

ABSTRACT OF THE DISCLOSURE

A panel construction comprising a plurality of longitudinally spaced transverse frame members, a panel mounted on said transverse frame members, said panel having two spaced parallel planar sheets and a plurality of thin spaced apart elongated strips of material disposed perpendicularly to and between said sheets and having edges in engagement with the surfaces of said sheets, and plastic foamed-in-place in the remaining spaces between said sheets and the strips re-inforcing said strips providing for acceptance of greater compressive loading in planes passing through the depth of the strips between the sheets, the axis of columnar growth in the cells of said foam plastic being generally parallel to the length of said elongated strips, substantially each of said strips being in upright position over a respective transverse frame member with the length of the strip extending lengthwise along the length of the transverse frame member for directing compressive loads on the panel to the transverse frame members.

---

Figure 1:
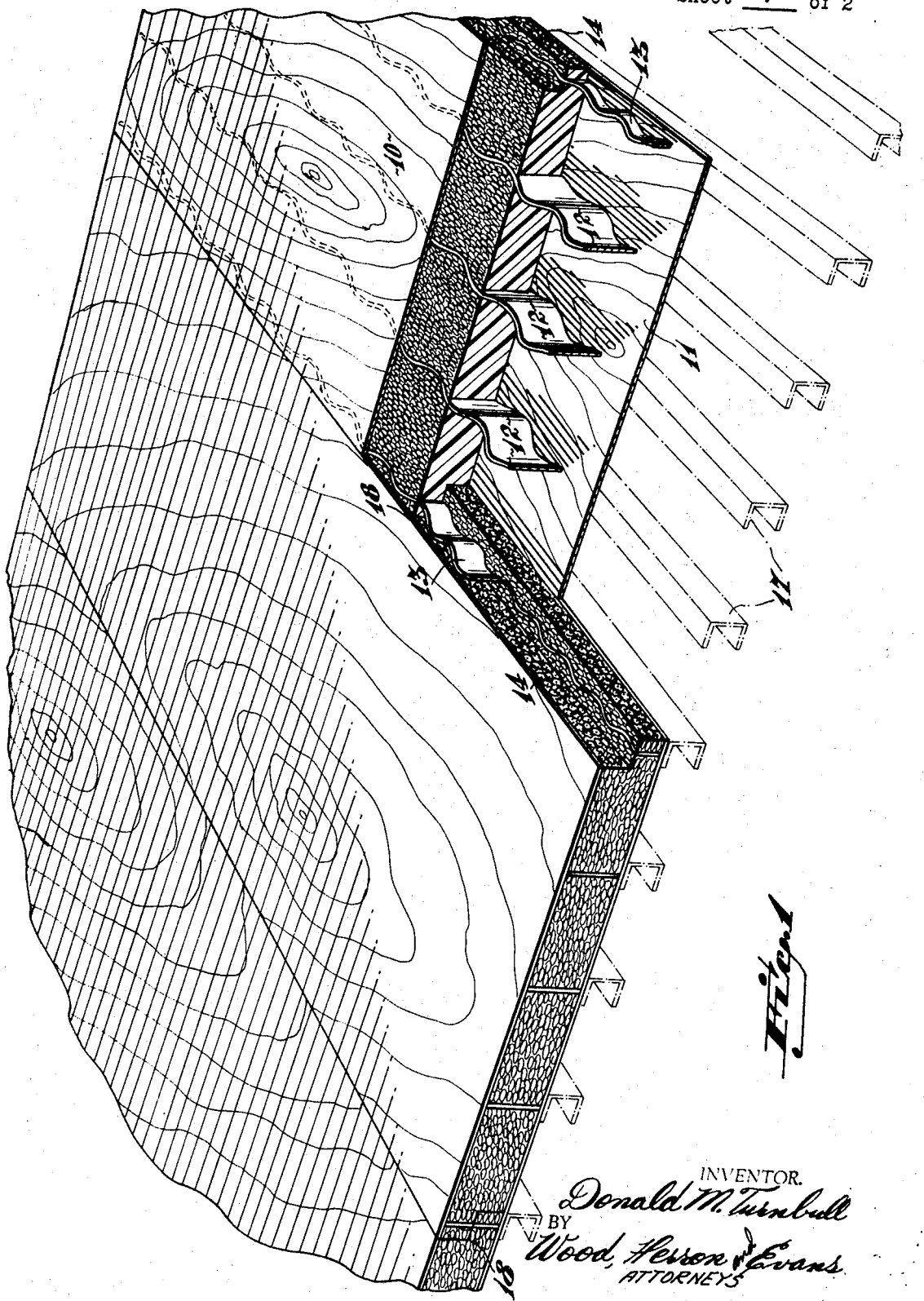

This invention relates to an insulated panel and more particularly the invention is directed to a pre-fabricated sandwich of a plastic foamed between a pair of spaced parallel sheets. Still more specifically, the invention is directed to an insulated panel which is used primarily in the floor of a refrigerated cargo body or other environment in which it is subjected to compressive loading.

In the past, it has been the practice to construct such panels of a pair of spaced plywood sheets having elongated two by fours spacing the sheets apart with the plastic material foamed-in-place between the sheets. In the co-pending application of George R. Heffner, Ser. No. 371,426, filed June 1, 1964, it has been pointed out that there are many advantages to be derived from the elimination of the wood cross bolsters and the substitution therefor of a material which is substantially entirely the foam employed to fill the major portion of the space between the two sheets. The substitution of the foam for the wood spacers results in a structure which has superior insulative qualities and which is markedly lighter in weight, thereby increasing the pay-load which can be carried by the cargo container.

The difficulty with the substitution of a plastic foam for the wood in such floor panels is that that plastic foam does not even approach the ability of wood to withstand compressive loading. In addition to its insulative qualities, the floor panel of the type to which the present invention is directed must withstand compression stress and must transmit the compression load on its upper surface to the transverse vehicle frame members which support the floor panels.

Heffner, in the co-pending application, has disclosed the combination of a tubular paper or plastic skin and foam united to form discs which exhibit a remarkable compression strength. He has also disclosed a particular method of making the compression disc-like supporting members wherein the members are adapted to receive a loading in the direction of the rise axis of the foam, the foam exhibiting a markedly greater resistance to compression strength in the direction of the rise axis as contrasted to the strength in a direction transverse to the rise axis.

It is an objective of the present invention to take advantage of the unusual strength developed in the combination of the foam and a paper or plastic skin, but which does not require any of the preliminary steps of forming special spacer members. This objective of the invention is obtained in part by preliminarily spacing the two panel skins or sheets apart by means of sinuous cardboard strips disposed on edge between the panel skins. Thereafter, the sandwich is filled with foam, preferably polyurethane, which is expanded in place. The sinuous cardboard spacers are spaced apart from each other on approximately twelve inch centers such as had been used in the spacing of the wood cross bolsters. It can be seen from this that through the present invention it is possible to substitute for the two by fours an extremely thin strip of cardboard. I have found that when the polyurethane is foamed-in-place, the foam supports and stabilizes the cardboard strips so that they can support tremendous loads without buckling.

This and other objectives of the invention will become more readily apparent from the following detailed description in which:

FIG. 1 is a perspective view of a panel structure employing the present invention, FIG. 2 is a perspective view illustrating a first step in the manufacture of the panel, FIG. 3 is a perspective view illustrating a further step in the manufacture of the panel, and FIG. 4 is a perspective view illustrating a final step in the manufacture of the panel.

A panel structure of the present invention is illustrated in FIG. 1. Each panel comprises a top skin or sheet 10 and a bottom skin or sheet 11, the sheets being spaced apart by sinuous cardboard strips 12. Half strips 13 are employed at the edges of the panels. These half strips, in combination with the foam around them, will form rabbet grooves 14 to facilitate the joining of adjacent panels.

The sandwich, as it has been described thus far, is formed by first adhesively securing the sinuous strips 12 and 13 on their edges to one of the plywood sheets as shown in FIG. 2. Adhesive is then applied to the free upstanding edge 15 of each strip 12 and to the other sheet 10 which is then laid on top of the strips as shown in FIG. 3.

Referring to FIG. 4, after the formation of the sandwich of top and bottom sheets with spacers, forms 16 are applied to the longitudinal edges of the sandwich and a foamable liquid is introduced into the cavities formed between the sheets 10 and 11 and strips 12 and 13 while the sandwich is held in a vertical position. The foaming of the plastic material causes it to expand to the top of the panel and in so doing it flows into intimate contact with the spacer strips 12 and 13. After the plastic has set, it stabilizes the cardboard strips and permits them to support tremendous loads without buckling.

The cardboard used as the sinuous strips 12 and 13 is a heterogeneous chip board which is preferably about 3/16 of an inch thick. The sinuous configuration of the cardboard is important in several respects. First, after forming the preliminary sandwich of sheets 10 and 11 with spacers 12 and 13, that sandwich must be handled in order to complete its formation through the introduction of the foaming liquid. If the strips 12 were straight rather than corrugated or sinuous, it would be difficult to prevent the collapse of the sandwich during the pre-foaming handling.

Second, the sections formed between adjacent spacers may be foamed one section at a time. The sinuous configuration of the spacers tends to resist the lateral forces applied by the foaming plastic material as a consequence of its expansion.

Third, the corrugated configuration of the spacers tends to spread the load applied to them over a wider area, or more specifically, over the area of the transverse members which form a part of the frame of the vehicle with which the panels are used.

Fourth, the fact of corrugating the cardboard sheets tends to enable them to resist a compression load better than they would if they were perfectly straight strips.

One form of employing the panels formed in accordance with the present invention is disclosed in the Heffner application. That method and vehicle structure would be equally suitable for use with the panels formed in accordance with the present invention. The details of it will not be repeated here suffice it to say that the panels each have a length approximately equal to the vehicle width and width which is convenient to handle and suited to the availability of materials. For example, the sandwich may be formed by four foot by eight foot plywood sheets. The panels are mounted on transverse frame members indicated in broken lines at 17 in FIG. 1. A rabbet joint is formed by the adjoining rabbet grooves 14 of adjacent panels as indicated at 18, the rabbet joints being reinforced by the spacer strips. Further, the rabbet joints are preferably disposed over transverse frame members 17 which provide additional support for the joints.

The advantages derived from the panel formed in accordance with the present invention can be appreciated by reference to FIG. 1. Instead of two by four spacers extending longitudinally of the respective panels, the invention employs extremely thin cardboard strips 12 and 13. The volume between the sheets 10 and 11 normally occupied by two by fours is therefore substantially entirely occupied by polyurethane foam. Since the foam is considerably lighter in weight and has a greatly increased resistance to thermal conductivity as contrasted to wooden two by fours, the resultant structure is both lighter and of an improved insulative quality. Even at the rabbet joint 18, no appreciable sacrifice in the insulative quality of the floor or of the ability of the floor to withstand the compression loading has been made in view of the overlapping configuration of the joint and the reinforcement of it by the cardboard strips.

While a marked improvement has been made in the insulative and weight aspects of the floor construction, the floor structure is more than strong enough to meet the requirements of usage, particularly the compression loading occurring through the use of a fork lift truck. This maintenance of the necessary strength to resist the force of compression is attained through the fact of foaming the polyurethane in place into intimate contact with the cardboard with that degree of compressive force against the surface of the cardboard to prevent its buckling under compressive stress.

I claim:

1. A panel construction suitable for mounting on a plurality of longitudinally spaced transverse frame members comprising:

a panel having two spaced parallel planar sheets and a plurality of thin spaced apart elongated strips of material disposed perpendicularly to and between said sheets and having edges in engagement with the surfaces of said sheets, and plastic foamed-in-place in the remaining spaces between said sheets and the strips thereby re-inforcing said strips and providing for acceptance of greater compressive loading in planes passing through the depth of the strips between the sheets, the axis of columnar growth in the cells of said foam plastic being generally parallel to the length of said elongated strips, substantially each of said strips being adapted to be placed in upright position over a respective transverse frame member with the length of the strip extending lengthwise along the length of the transverse frame member for directing compressive loads on the panel to the transverse frame members.

2. The invention according to claim 1, and said strips being of sinuous cross section configuration in planes generally parallel to said sheets.

3. The invention according to claim 1, and said strips being made of cardboard.

4. The method of making a panel construction of an insulated panel adapted to be mounted on transverse frame members comprising the steps of:

securing elongated thin strips along their edges to the facing surfaces of two spaced apart parallel planar sheets, the strips being sandwiched between the sheets and generally perpendicular to their planes, such that the distance between each strip when the said panel is placed over transverse frame member is the distance between the transverse frame members, introducing a foamable plastic material between said sheets in sufficient quantity so that it will, upon expansion, fill the space between said sheets with the cells of the plastic material elongated in a direction parallel to the length of the strips, causing said plastic material to expand and set.

5. The invention according to claim 4, and said strips being of sinuous cross section configuration in planes generally parallel to said sheets.

6. The invention according to claim 4, and said strips being made of cardboard.

References Cited

UNITED STATES PATENTS

| | | | |
|---|---|---|---|
| 2,376,653 | 5/1945 | Boyer | 161—145 XR |
| 2,583,443 | 1/1952 | Perry et al. | 156—281 X |
| 2,973,295 | 2/1961 | Rodgers | 161—121 |
| 3,166,454 | 1/1965 | Voelker | 156—78 |
| 3,185,611 | 5/1965 | Rodman et al. | 161—36 |

EARL M. BERGERT, *Primary Examiner.*

H. F. EPSTEIN, *Assistant Examiner.*

U.S. Cl. X.R.

52—309, 618; 108—51; 161—161; 264—45